(12) United States Patent
Jones et al.

(10) Patent No.: US 8,239,461 B2
(45) Date of Patent: Aug. 7, 2012

(54) METHOD AND SYSTEM FOR ACCESSING SEARCH SERVICES VIA MESSAGING SERVICES

(75) Inventors: Scott A Jones, Carmel, IN (US); Thomas E Cooper, Carmel, IN (US)

(73) Assignee: ChaCha Search, Inc., Carmel, IN (US)

( * ) Notice: Subject to any disclaimer, the term of this patent is extended or adjusted under 35 U.S.C. 154(b) by 643 days.

(21) Appl. No.: 11/819,719

(22) Filed: Jun. 28, 2007

(65) Prior Publication Data
US 2009/0006333 A1    Jan. 1, 2009

(51) Int. Cl.
*G06F 15/16* (2006.01)
(52) U.S. Cl. ........................ 709/206; 709/219
(58) Field of Classification Search .......... 709/201–207; 707/1–10
See application file for complete search history.

(56) References Cited

U.S. PATENT DOCUMENTS

| | | | |
|---|---|---|---|
| 6,223,165 B1 | 4/2001 | Lauffer | |
| 6,332,141 B2 | 12/2001 | Gonzalez et al. | |
| 6,377,944 B1 * | 4/2002 | Busey et al. | 707/3 |
| 6,381,640 B1 | 4/2002 | Beck et al. | |
| 6,393,423 B1 | 5/2002 | Goedken | |
| 6,430,602 B1 | 8/2002 | Kay et al. | |
| 6,434,549 B1 * | 8/2002 | Linetsky et al. | 707/3 |
| 6,513,013 B1 | 1/2003 | Stephano | |
| 6,678,673 B1 | 1/2004 | Eves et al. | |
| 6,691,159 B1 | 2/2004 | Grewal et al. | |
| 6,829,585 B1 | 12/2004 | Grewal et al. | |
| 6,895,406 B2 | 5/2005 | Fables et al. | |
| 6,898,625 B2 * | 5/2005 | Henry et al. | 709/206 |
| 6,941,372 B2 | 9/2005 | Pearson | |
| 6,973,482 B2 | 12/2005 | Mohammed et al. | |
| 6,985,943 B2 | 1/2006 | Deryugin et al. | |
| 6,990,189 B2 | 1/2006 | Ljubicich | |
| 6,993,555 B2 | 1/2006 | Kay et al. | |
| 7,000,019 B2 | 2/2006 | Low et al. | |
| 7,013,263 B1 | 3/2006 | Isaka et al. | |
| 7,016,889 B2 | 3/2006 | Bazoon | |
| 7,027,987 B1 | 4/2006 | Franz et al. | |
| 7,039,681 B2 | 5/2006 | Nolte et al. | |

(Continued)

FOREIGN PATENT DOCUMENTS
WO    WO 2004/057473    7/2004
(Continued)

OTHER PUBLICATIONS

International Search Report mailed Oct. 10, 2008 in corresponding International Search Report 1918.1012PCT.

(Continued)

*Primary Examiner* — Ian N Moore
*Assistant Examiner* — Afshawn Towfighi

(57) ABSTRACT

A user using a chat or instant message, mobile message or email type of interface, for example, an information seeker, can connect via an instant message, mobile message, email or chat type of service provider, for example, an America Online Instant Messenger (AIM) server. The message server connects the user to a routine that allows the user to utilize his or her service interface in combination with the services provided by the information search system. After connection has been established via the message interface, for example, an instant message is received via the chat process. A query string can then be extracted from the instant message and passed to the search system, which can respond with search results.

29 Claims, 10 Drawing Sheets

U.S. PATENT DOCUMENTS

| | | | |
|---|---|---|---|
| 7,047,229 B2 | 5/2006 | Goel | |
| 7,571,212 B2 * | 8/2009 | Reynolds et al. | 709/206 |
| 2001/0034015 A1 | 10/2001 | Raichur et al. | |
| 2001/0037316 A1 * | 11/2001 | Shiloh | 705/74 |
| 2002/0114519 A1 * | 8/2002 | Mastrianni et al. | 382/199 |
| 2002/0133481 A1 | 9/2002 | Smith et al. | |
| 2002/0140715 A1 | 10/2002 | Smet | |
| 2002/0167539 A1 | 11/2002 | Brown et al. | |
| 2003/0070176 A1 | 4/2003 | Parker et al. | |
| 2003/0086558 A1 | 5/2003 | Seelig et al. | |
| 2003/0112927 A1 | 6/2003 | Brown et al. | |
| 2003/0140103 A1 * | 7/2003 | Szeto et al. | 709/206 |
| 2003/0144895 A1 * | 7/2003 | Aksu et al. | |
| 2004/0054802 A1 | 3/2004 | Beauchamp et al. | |
| 2004/0117383 A1 | 6/2004 | Lee et al. | |
| 2004/0139156 A1 | 7/2004 | Matthews et al. | |
| 2004/0243454 A1 | 12/2004 | Yoshida | |
| 2005/0010641 A1 | 1/2005 | Staack | |
| 2005/0021599 A1 | 1/2005 | Peters | |
| 2005/0055321 A1 | 3/2005 | Fratkina et al. | |
| 2005/0086211 A1 | 4/2005 | Mayer | |
| 2005/0086290 A1 | 4/2005 | Joyce et al. | |
| 2005/0114789 A1 | 5/2005 | Chang et al. | |
| 2005/0141694 A1 * | 6/2005 | Wengrovitz | 379/265.09 |
| 2005/0223067 A1 * | 10/2005 | Buchheit et al. | 709/206 |
| 2006/0036692 A1 | 2/2006 | Morinigo et al. | |
| 2006/0069730 A1 | 3/2006 | Azuma | |
| 2006/0095531 A1 * | 5/2006 | Cho | 709/207 |
| 2006/0150119 A1 * | 7/2006 | Chesnais et al. | 715/810 |

FOREIGN PATENT DOCUMENTS

| | | |
|---|---|---|
| WO | WO 2006/014824 | 2/2006 |

OTHER PUBLICATIONS

U.S. Appl. No. 11/336,928, filed Jan. 23, 2006, Scott A. Jones, Chacha Search, Inc.
U.S. Appl. No. 11/469,732, filed Jul. 10, 2006, Scott A. Jones et al., Chacha Search, Inc.
U.S. Appl. No. 11/647,437, filed Dec. 29, 2006, Scott A. Jones et al., Chacha Search, Inc.
U.S. Appl. No. 11/647,309, filed Dec. 29, 2006, Scott A. Jones et al., Chacha Search, Inc.
U.S. Appl. No. 11/774,852, filed Jul. 9, 2007, Scott A. Jones et al., Chacha Search, Inc.
U.S. Appl. No. 11/779,502, filed Jul. 18, 2007, Scott A. Jones et al., Chacha Search, Inc.
U.S. Appl. No. 11/819,719, filed Jun. 28, 2007, Scott A. Jones et al., Chacha Search, Inc.
U.S. Appl. No. 11/835,016, filed Aug. 7, 2007, Scott A. Jones et al., Chacha Search, Inc.
"QuickFindIt" retrieved from Internet URL: http://www.quickfindit.com/Search_Engines/search-chat.html on Sep. 18, 2007.
International Search Report mailed on Octobber 10, 2008, in PCT/US08/68770 (U.S. Appl. No. 11/819,719).
International Preliminary Report on Patentability mailed on Jan. 14, 2010 in PCT/US08/68770 (U.S. Appl. No. 11/819,719).

* cited by examiner

METHOD AND SYSTEM FOR ACCESSING SEARCH SERVICES VIA MESSAGING SERVICES

BACKGROUND

1. Field

The present invention relates, generally, to information search systems, and more specifically, to information search systems in which human searchers provide search results to information seekers via a messaging service interface.

2. Description of the Related Art

In a search system utilizing human searchers, it is important to not only provide accurate search results to information seekers, but also to provide the search results as quickly as possible. In some instances, however, accuracy of the search results depends on the accuracy of the query on which the search results are based.

For example, an information seeker may enter a search query requesting a search system to provide results, for example, "Who was pitching in the 2005 World Series?" In such an instance, a human searcher or guide in an information search system utilizing human searchers may respond with search results that include the name of a pitcher for the winning team. Upon receiving the results of the search query, the information seeker may have realized that he did not accurately present the search query, as the information seeker intended to ask, "Who was the losing pitcher in the $3^{rd}$ game of the 2005 World Series?" or "What was the name of the jerk that cost the Sox the Series 3 years ago?"

As another example, an information seeker may enter a search query requesting a search system to provide results, for example, "Who was quarterbacking in the 2005 Super Bowl?" In such an instance, a human searcher or guide in an information search system utilizing human searchers may respond with search results that include the names of both the quarterback(s) of the winning team and the quarterback(s) of the losing team. Upon receiving the results of the search query, the information seeker may have realized that he did not completely disambiguate the search query. The information seeker may have intended to also obtain information regarding which quarterback(s) was playing for which team.

As a result of the failure of the information seeker to accurately capture his or her exact intention, the information seeker may have to submit a second search query to the system to obtain the desired information, thereby incurring additional wait time and occupying resources of the search system. The ambiguity of natural language queries can present problems.

Both the information seeker (user or requester) and the human searcher (guide or provider) may become frustrated. The information seeker may become frustrated as a result of not having received the expected result in response to search query(s). As a result, the information seeker may believe that the searcher assigned to provide the search results did not perform well in responding to the query because the information seeker did not received the best or expected search results. The information seeker may rate the guide with an undesirable or poor performance rating because the results were not what the info seeker (requester) expected. Receiving a poor performance rating may cause the guide to become discouraged, and decide not to accept search queries. A poor or unexpected response to a query likely causes the user to repeat the search. The resources of the system, search server, guide(s), etc. would be used repeatedly, decreasing the productivity and efficiency of the system.

In search systems such as the one described above some information seekers with access to an instant messaging service, email service or mobile messaging service may not wish to utilize or may not have access to browser systems. As general search systems accept "browser-type" traffic and do not typically include a message client process, information seekers having access to only a messaging service type of interface or desiring to use a messaging service (interactive natural language) type of interface, cannot utilize search services offered by general search systems.

SUMMARY

What is needed is a system and method for allowing a user utilizing functionality provided via a an instant message, email, or mobile messaging interface to utilize search services provided by an information search system employing human searchers.

In at least one embodiment, a method and system for interacting with a human information searcher is provided in which a chat or interactive natural language connection is established with the human information searcher and a response to an information search query provided by a human searcher is sent to an information seeker via the chat connection.

A user or information seeker using a chat or instant message type of interface can connect via an instant message or chat type of service provider, for example, America On-line Instant Messenger (AIM®) server. The instant message server connects the user to a routine associated with a search system that allows the user to utilize his or her chat service interface in combination with the services provided by the information search system.

After connection has been established to an instant message interface an instant message is received via the chat process. A query string can then be extracted from the instant message and passed to the search system, which can respond with search results and other appropriate information.

In another embodiment, a method and system for interacting with a human information searcher is provided in which an email connection is established with the human information searcher and a response to an information search query provided by a human searcher is sent to an information seeker via the email connection.

A user or information seeker using an email type of interface can connect via an email service provider, for example, Gmail®. The email message service connects the user to a routine associated with a search system that allows the user to utilize his or her email service interface in combination with the services provided by the information search system.

After connection has been established to an email interface an email message is received via the email message process. A query string can then be extracted from the email message and passed to the search system, which can respond with search results and other appropriate information.

In another embodiment, a method and system for interacting with a human information searcher is provided in which a mobile messaging connection, for example SMS, EMS, or MMS is established with the human information searcher and a response to an information search query provided by a human searcher is sent to an information seeker via the mobile messaging connection.

A user or information seeker using a mobile messaging type of interface can connect via a mobile message service provider, for example, Verizon or Cingular. The mobile message service connects the user to a routine associated with a search system that allows the user to utilize his or her mobile message service interface in combination with the services provided by the information search system.

After connection has been established to a mobile message interface a mobile message is received via the mobile message process. A query string can then be extracted from the mobile message and passed to the search system, which can respond with search results and other appropriate information.

BRIEF DESCRIPTION OF THE DRAWINGS

Aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
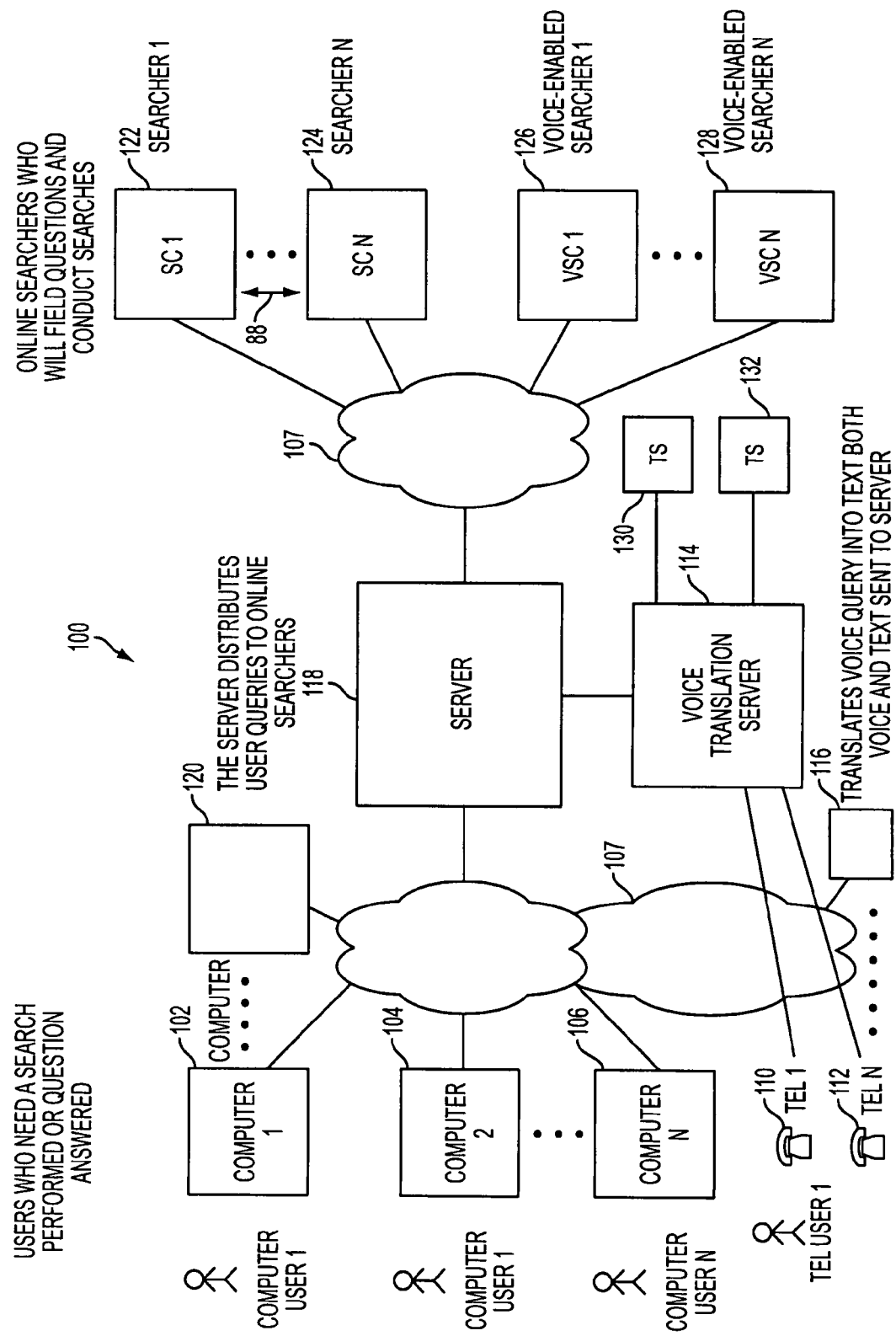
FIG. 1 is a system diagram of the system for chat based search.

Reference will now be made in detail to the embodiments described herein, examples of which are illustrated in the accompanying drawings, wherein like reference numerals refer to like elements throughout.

As illustrated in FIG. 1, guides or human searchers such as a human searcher using SC1 122, for example, are humans who perform searches on information queries submitted by a user or requester, for example, an information seeker using computers 102, for example, as described in more detail in U.S. application Ser. No. 11/336,928, filed Jan. 23, 2006, by Scott A. Jones, entitled, "A Scalable Search System Using Human Searchers," and incorporated herein by reference.

The embodiments described herein include a system 100 that allows queries by users or information seekers (InfoSeekers™), such as a worker, a housewife or a child, to be searched by human searchers to provide the information seekers with search results. The human searchers or guides may be professional paid searchers (PaidSearchers™) as well as amateur and/or volunteer searchers. For example, the query (which, throughout this description, may entail a fully-formed question/sentence or a keyword or a list of keywords or a search phrase as previously discussed) might request, for example, the closing time of a particular restaurant, the winner of the 1960 World Series, or information regarding a medical illness (or any other type of query). As depicted in FIG. 1, the queries can originate from user computer systems 102-106 and are received over a communication system 107 or from telephone handsets 110-112. The user computer systems can be a typical desktop or laptop system, a handheld computer such as a personal digital assistant (PDA), a basic cellular telephone, a text-enabled cellular telephone, a specialized query terminal, or any other source that allows a user to enter a query. (NOTE: the words "speech" and "voice" are used interchangeably in this discussion). The telephone handsets can be typical touch-tone telephones, cellular telephones, two-way radios or any other communication device that allows the user to communicate over a distance. The communication system can include packet switched facilities, such as the Internet, circuit switched facilities, such as the public switched telephone network (PSTN), radio based facilities, such as a wireless network, etc.

The speech queries submitted by telephone 110-112 are stored in the system database and converted into digital text queries by a speech translation system 114. (Alternatively, the user's computer 102-106 or telephone 110-112 may perform this processing). The speech translation system 114 handles the task of translating the speech into text, possibly by interaction with other systems, or it may perform the task locally. It may perform speech to text conversion via speech transcription using human transcribers or using conventional speech-to-text processing, also known as automatic speech recognition (ASR). The speech queries can originate from a user's telephone and can be initially handled via automated attendant speech prompt type processing (or alternatively, via an interactive speech response or IVR system) to obtain the user's query.

The speech translation server 114 keeps track of the port from which the call originated and assigns a user identifier to the user 110-112 on this port for a particular session. The system 114 can prompt the user to speak the query. The speech queries can also originate from another source 116 called a "speech query service requester" (SQSR) rather than directly from the user, such as a private or public information provider. For example, a speech query can be initially processed by a public library telephone system and switched to the server 114. The speech query may physically arrive at the system via a variety of input means, including time-division multiplexed lines, voice over IP (VOIP) packets from an Internet connection, and other sources. The speech query may arrive as a stream or packet or series of packets.

Similarly, a commercial site, such as a grocery store ordering system where a user orders food and inquires about recipes for a special after-dinner dessert can initially process a speech query and pass it along to the speech translation server 114.

The SQSR 116 may communicate with the speech translation server 114 via a variety of mechanisms including an IP-based socket address or via a Microsoft.NET service, making the translation services of 114 widely available via the Internet to any application that wishes to use them.

The packet can then be processed locally at the speech translation server 114 to convert it from digitized speech into text or, alternatively, it may be processed by a remote system. If the digitized speech is being transcribed by human transcribers, this can be accomplished by sending the digitized speech to one or more transcriber systems (TS) 130-132 where human transcribers can hear the speech, for example via headphones or speakers, and transcribe the information by typing the text into their system, so that the text is then sent back to the speech translation server 114 (or alternatively, directly to the query server 118 or to the SQSR 116), all within a matter of seconds (preferably less than 10 seconds after the user has finished speaking the query). To speed up processing, the speech query can be and typically is preferably broken up into a stream of packets and passed to the transcriber, without interruption, as it is being spoken by the user, thereby allowing for reduced latency in the system. Preferably, there are many more transcribers available in the system than there are instantaneous queries so that delays are not induced into the system. In the case of an overflow of queries, a form of flow control may be utilized by telling some callers that they must hold on the line for an available transcriber (which might be described to the caller as holding for an operator or agent). Preferably, the speech translation server 114 maintains a database of all transcribers that are currently logged-in and available to perform the service of transcription using a transcription software application on their transcription system 130-132. Alternatively, this function of tracking the availability of transcribers might be located on a remote system and/or might be implemented using a distributed mechanism among transcriber systems 130-132 (for example, using peer-to-peer (P2P) mechanisms).

The speech translation server 114 may feed continuous sequential speech phrases from various and different sources (e.g. users) to any given transcriber 130. Hence, the transcriber is sequentially transcribing, in rapid succession, speech messages from various speakers and creating separate text packets that are associated with each speech message.

Once the query is in digital text form, it is provided to the query server 118. The text entry features of cellular telephones can also be used to enter a query in digital text form allowing users to submit queries textually from telephones.

Queries from a graphical user interface (GUI) of the user computers 102-106 can originate directly from the user, or like the speech queries, indirectly through a TQSR (Text Query Service Requestor) 120, which may be any software application or device connected via the Internet, for example As in the speech query, a user may be on a grocery store web site ordering food for delivery and may inquire about a recipe for a special dessert. This recipe query would be forwarded to the query server 118. Any web site, consumer electronics device, or other device may become a TQSR or SQSR for performing a search. For example, a set top box offered by a satellite TV or Cable TV provider could offer the ability to enter a query string and act as a TQSR or SQSR. Any software application running on a PC, such as Microsoft's Word or Excel, may also serve as a TQSR or SQSR.

An appropriate interface, such as a graphical user interface (GUI) for the computer 102 or speech prompt system in the speech translation system 114 extracts a query from the user and transmits the query to the query server 118.

Upon the receipt of a query, such as from user computer 102 in this example, the query server 118 can provide information (e.g. advertisements) to the user for the user to see or hear while the search is being processed. This information can be related to the query (or to the keywords of the query) and may include visual and audio information as appropriate for the user's device and for the source of the query, such as a grocery store ad in the recipe example. This information can include not only advertisements, but also information such as video, music, games, web links, etc. that will interact with and display for the user while the search is being performed. The information provided may serve as a source of revenue, for example through advertising. If the user views an ad, or clicks on a link, or purchases a product (sometimes referred to as "conversion") related to an advertisement while awaiting results of a search, the database can be updated to reflect additional ad revenue with a credit of some sort to the searcher. A digital text, graphics, audio, or video advertisement may be displayed (or played) on a user computer, 102 a user telephone (112) or other user device. The particular advertisement selected is or can be based on a weight associated with the advertisement based on single or combined factors such as advertiser contract commitments, bidding price of advertisers, popularity with users, keyword mapping to advertisements, statistical usage (e.g. least recently presented), user demographics, searcher choice of advertisement, etc.

The server 118 processes the arriving queries by determining which searchers are available to search for the information being requested, based upon factors such as the searcher being logged in, searchers who are signed up for a keyword, or category, or the ranking of the searcher based on previous performance.

The server 118 can also determine if this particular query has been received previously and can send a response to the user with previously obtained search results without necessarily invoking a human searcher.

When no previous query results satisfying or that may satisfy the query are available, the server 118 may send the query to one or more available searcher(s) over the communication system 107. If the query is a speech query, in addition to sending the text version of the query and the keywords, the speech recording of the query can be transmitted. The human searchers can be located at computer-based searcher tool systems 122-124 speech-enabled computer-based searcher systems 126-128, and/or other suitable searcher (guide or provider) systems.

A server-chosen searcher (or searchers) reviews the query, including the keywords and any speech recording and decides whether to accept the search. When the searcher accepts the search task, this acceptance may be communicated back to the user who originated the query through the server 118. This may happen automatically or manually. Because some searches may require additional information or clarification, the searcher can send a request for additional information to the user. This can be sent through server 118 or via direct link to the user via the communication system 107. The user replies with a clarification, additional information or a revised query. The searcher then uses the searcher tool system 122-128 to perform a search of publicly or privately available information to produce search results. For example, the searcher may use conventional tools, such as a browser, to access public databases via searches over the World Wide Web or private databases that may be accessible only to the searcher, such as a database of information previously gathered by the searcher, or from results stored on the query server 118 from other searchers, or from databases that require payment for access or even information available to the searcher in non-electronic form, such as a book on the searcher's bookshelf, test results from a personal experiment, etc. The searcher may also submit the search query, or some version of it to an automated search tool such as the Google or AskJeeves systems. The search results, such as an answer, comments by the searcher, web pages, web links, and other query related information, etc. are gathered by the searcher during the search. The results of the search, such as web pages and links which the user can review or use to obtain the information desired, an answer to a question and web pages or links to web pages that support the answer, etc., is transmitted back to the user through the server 118 or directly to the user via the communications system 107. The information returned is typically what the searcher thinks or intends can satisfy the need of the user. The information can include anything that could satisfy the user, including a document, a video, a song, a configuration file, pictures, links, etc.

The results are presented to the user in real-time, constrained by the amount of time it takes to find a searcher and do the search. Available searcher(s) are preferably identified within one to fifteen seconds and the searcher preferably begins the work of performing the search with one to fifteen seconds. Depending on the search, the accumulation of relevant results may generally take from a few seconds to a few minutes. The server or search tool may interact with the user automatically every approximately 6 seconds via the chat session (or via the VOIP connection) in order to signify to the user that progress is being made. This might be as simple as a dot typed on the user's screen or a more detailed automated message. When on a telephone, the user will preferably be hearing or watching an advertisement, but during silent periods, the user interaction may occur via speech such as having the searcher or an automated speech system say, "Please continue to hold while your search is being performed". The searcher may interact with the user, either of his or her own accord or the searcher tool may remind the searcher to give status to the user. The searcher may also send partial results to the user so that the user may begin to preview results. The server 118 stores the query phrase and the search results for matching with future queries.

In at least one embodiment, a user, for example, an information seeker using computer 102 can chat with a search system. In particular, the search system appears to the information seeker as another chatter or buddy. As a result, the information seeker using computer 102 can chat with a guide using computer 122 via the server 118, as will be described in more detail herein below.

Figure 2:
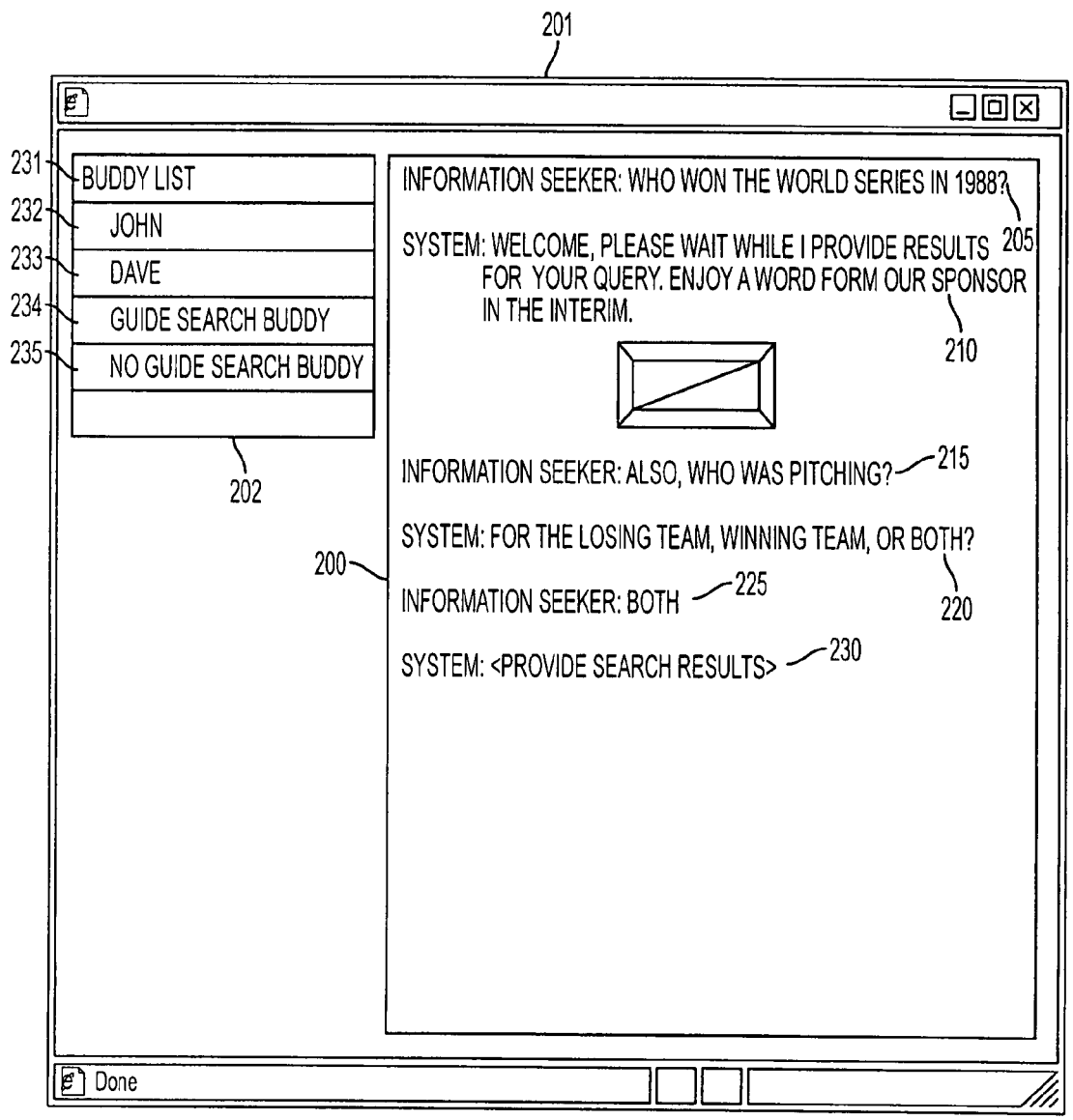
FIG. 2 is an illustration of an information seeker and guide interactive chat GUI.

As illustrated in FIG. 2, the chat client 200 can be located on the computer of an information seeker. The information seeker can utilize a computer chat or instant message session to obtain search results in response to a user query according to embodiments described herein. The users can utilize the functionality provided by a chat service or an instant message service, for example AIM®, MSN Messenger®, or Google Talk®). To utilize the search services provided by using such a chat or an instant message service interface, a connection using an instant message client 323, for example, should be established. To allow this to happen, the search system 380 logs into the instant message service 320 and thereby registers as an online buddy or buddies on that service.

When a user at, for example, computer 322, logs into a system that provides an instant messaging (IM) service, the user is presented with a window 201 or Graphical User Interface (GUI) that includes buddy list frame 202 with a list of buddies 231, 232, and 233, for example, who are on-line. When the search system 330 is also logged into the instant messaging service, the buddy list can include search buddy(s) 234 and 235, for a search with a guide and a search without a guide, respectively. When the user selects the guide search buddy 234, a chat session for a search with a guide is opened. Similarly, when the user selects the no guide search buddy 235, a chat session for a search without a guide is started.

Figure 3:
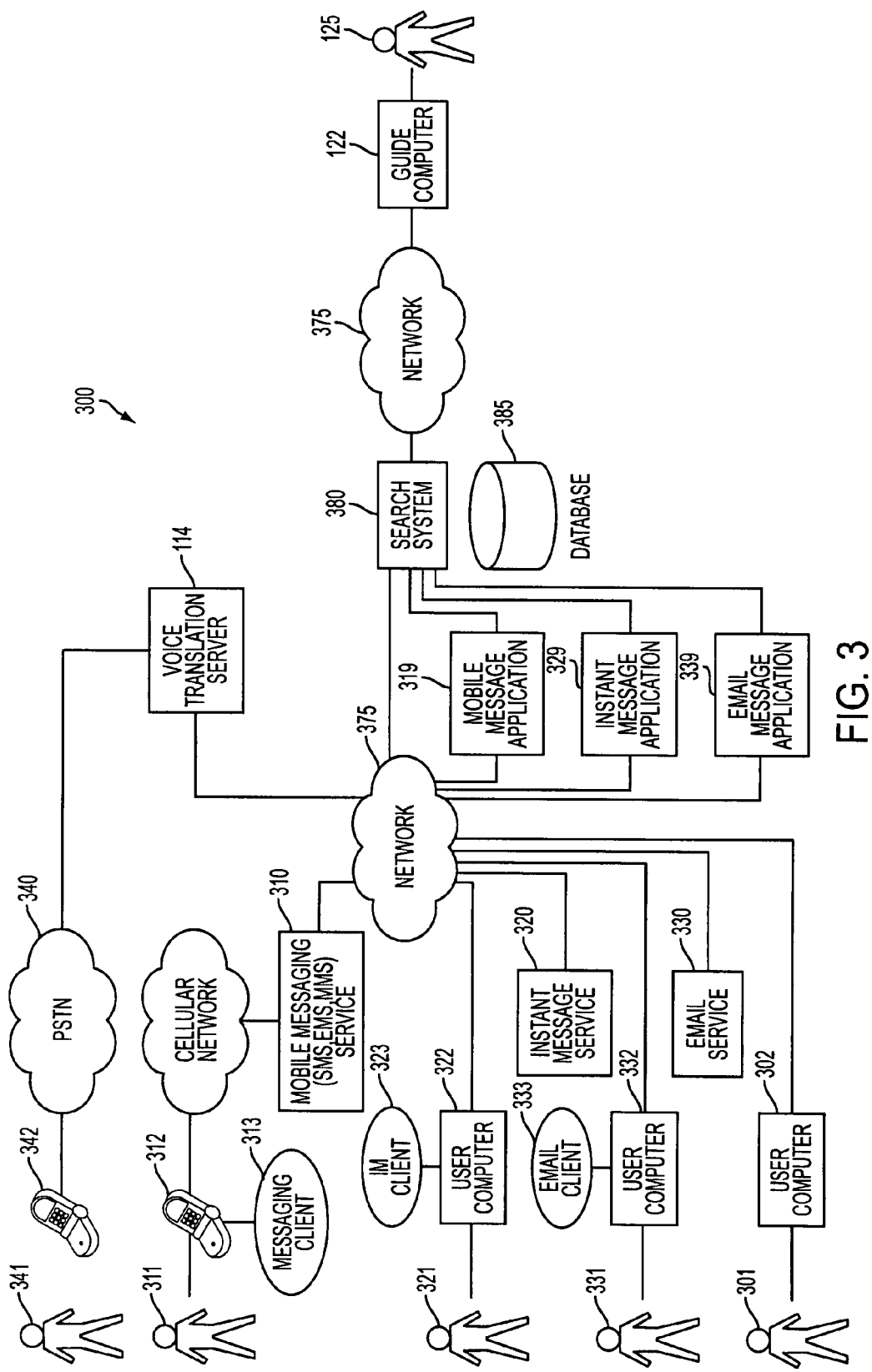
FIG. 3 is a system diagram illustrating the specific components of a messaging interface to a human search system.

A computer-readable storage including a database 385 is provided to allow anonymous communication by the user and the searcher and reconnection between the user and the searcher during follow-up communications. An exemplary system for anonymous communication is disclosed in a related provisional patent application 60/807,697 entitled, "Anonymous Search System Using Human Searchers," filed Jul. 18, 2006 by Scott A. Jones et al. The database 335 can include a buddy list identifier including a chat buddy representing a search system interface to a search system including a human searcher, or an identifier identifying guided search buddy 234 or an identifier for an unguided search buddy 235. The database 335 can include an online status indicator indicating whether a chat buddy identified by the buddy list identifier is currently busy. For example, if the guide is responding to a query, or the system is locating a suitable guide, a guide search buddy 234 indicator can specify "busy" to the information seeker, thereby informing the information seeker that he or she would have to wait until the guide search buddy is unoccupied. The database 385 further contains a unique User ID which is associated with the IM identification credentials, email address, or phone number of the user who initiates the query. This user ID is uniquely associated with messages received via the messaging service for example, 310, 320 or 330 (FIG. 3).

The chat session can begin by the information seeker initiating or posting a "chat" search query. For example, in at least one embodiment, the information seeker enters or posts the search query 205, "Who won the World Series in 1988?" The system can respond with a posted text string 210, for example, "Welcome, please wait while I provide results for your query. Enjoy a word from our sponsor in the interim." In such an instance, the system can provide a hyperlink, an image, or other graphical display pertaining to advertising a product or service. This information can be displayed to the user directly in the case where the user has a simple IM interface, or could trigger secondary display of the URL, or other information within a web page which contains an embedded chat interface, such as Web AIM™. Likewise the search system 380 may send images, audio or video or any other media which is supported by the IM client 323.

It should be noted that at any time, the information seeker can submit or post additional text strings or other information, via the chat interface, in an attempt to further refine his or her search or to assist the system (and/or searcher) with accurately providing search results in response to the information seeker's query. For example, as illustrated in FIG. 2, the information seeker can enter the text string 215 in which the information seeker indicates that he or she would like to know 'who was pitching?' in the game.

In such an instance, it may be determined by the system or the searcher that the query is ambiguous, as at least two pitchers pitched in the baseball game, that is, a player from the losing team and a player from the winning team. Not knowing whether the information seeker intended to obtain information regarding the losing team pitcher, the winning team pitcher, or both of the pitchers, a response 220 can be sent seeking clarification of the question presented in the text string 215. The information seeker can then provide the clarification response 225, thereby indicating, for example, that he desires to obtain information regarding both pitchers in the baseball game. Finally, search results are provided to the information seeker in system response 230, as illustrated in FIG. 2.

Therefore, as illustrated in FIG. 3, at least one instant message application process 329 is provided. The instant message application 329 connects with the instant message service 320. It should be noted that the search system, the IM chat server, and the instant message application server are communicatively coupled to allow a human searcher to provide a response to an information search query submitted by an information seeker via the chat interface. It is possible for multiple instant message applications to be running, providing connectivity to multiple instant message services.

The instant message application 329 serves as a programmatic chat client or instant message client that simulates a typical chat client or instant message client, thereby appearing to the user 321, for example, as a chat buddy. Thus, the computer 322, for example, includes an instant messenger client 323 that communicates with the instant message application process 329, via an instant messaging chat process.

Continuing with the description of FIG. 3, the search system 380 receives notification via the instant message application 319 from the IM service 320 that the user 321, for example, desires to connect to the search system 380, that is, what appears to the user 321 as a chat buddy. Since the Instant Message application process 329 contains the necessary code to effectively integrate with the instant message service 320, the user 321, for example, is able to chat with the search system 380.

It should be noted that the instant message application process 329 can be located on an application server or directly on the search system 380. After being presented with the disclosure herein, one of ordinary skill in the relevant art will realize that the application process 329 may be located on any other viable system which can provide a suitable interface to the instant message service 320.

While the IM application process 329 is illustrated as being connected to a single instant message service 320, it will be obvious to one of ordinary skill in the art that multiple IM application processes which can connect to various IM services such as AIM®, GoogleTalk®, MSN Messenger®, etc. can be implemented in order to allow users of any IM service to access the search system 380.

While some users may desire to connect to the search system 380 using an instant messaging service 320, other users may prefer to use an email service 330 or mobile messaging service 310. In order to provide services to those users, it is necessary for the search system to be able to appear as a valid user to the email service 330 or the mobile messaging service 310. This connectivity can be provided using the email message application 339, or the mobile message application 319.

The email message application 339 allows the same functionality as the IM application for a user 331, for example. A user, for example user 331, is able to send email messages via an email client 333 which may be resident on user computer 332, or on the email service 330 server, or on any suitable device that allows the user to access the email service. Those messages may be in SMTP, ESMTP, or other formats, and can be received using POP or other mail protocols. In the email messaging case, the parsing of the inputs from the user must be performed according to a different format than the IM application 329. The keywords of the query may, for example, be extracted from the subject or the body of the email. In addition, the email message application 339 may be required to manage attached files, and the forwarding of those attachments to the search system 380.

The email message application 339 must also be able to communicate with the email service 330 in order to login to the service and send and receive messages from an established email user ID (searchchacha@chacha.com), for example.

The email message application 339 may further allow the use of standard query templates which can be used to construct query strings for the search system 380. For example, a standard title could be used to identify each type of query template. In addition, the user (Infoseeker™) may be presented with an HTML form that will help to send an unambiguous query rapidly to the search system. In that case, the structured query may facilitate an automated response by the search system, or may allow more effective selection of a suitable guide.

Any request for clarification, automated search results or human searcher generated results from the search system 380 are routed back to the originating email address via the email message application 339. The email message application 339 then reformats the request or search results into an email and sends that back to the user's email address via the email service 330. The search system may associate a unique user ID with the email address of the message received from a user. That unique ID is stored in the database 385 along with the user email address. This allows the system to identify previous queries, etc. when the user next connects to the search system 380.

It should be noted that the email message application 339, the search system 380, and the email service 330 are communicatively coupled to allow a human searcher or a search system to provide a response to an information search query submitted by an information seeker via the email service 330.

In addition to email and IM access, some users, user 311, for example, may desire to access the search system 380 using mobile messaging technologies, such as SMS, EMS, and MMS. These services can be provided using a wireless network 380, a messaging client 313 which may be resident on the user's mobile device 312, a mobile messaging service 310, and a mobile message application 319. The wireless network may be implemented using FDMA, GSM. GPRS, CDMA, WDMA, and other wireless protocols.

The mobile message application 319 provides the same functionality as the IM application for user 311, for example. The messaging client 313 sends a suitably formatted message to the mobile messaging service 310 via the wireless network 380. The message is then sent to the mobile message application 319 via the network 375. The mobile message application appears as a phone number or WAP number to the mobile messaging service 310. The mobile message application 319 receives the message and parses the message in order to create a suitable query for the search system 380, based on the format of the received mobile message. The mobile message application may also send additional data such as the caller ID or other information associated with the user 311, for example, to the search system 380.

Any request for clarification, automated search results or human searcher generated results from the search system 380 are routed back to the originating mobile device 312, for example, via the mobile message application 339. The mobile message application 339 then reformats the request or search results into a mobile message and sends that back to the user via the mobile messaging service 330. The search system may associate a unique user ID with the phone number of the message received from a user. That unique ID is stored in the database 385 along with the user phone number. This allows the system to identify previous queries, etc. when the user next connects to the search system 380.

While the system is illustrated with only one mobile message application 319 and one email message application 339 multiple applications may be present in order to support multiple email, or mobile message services.

Figure 4:
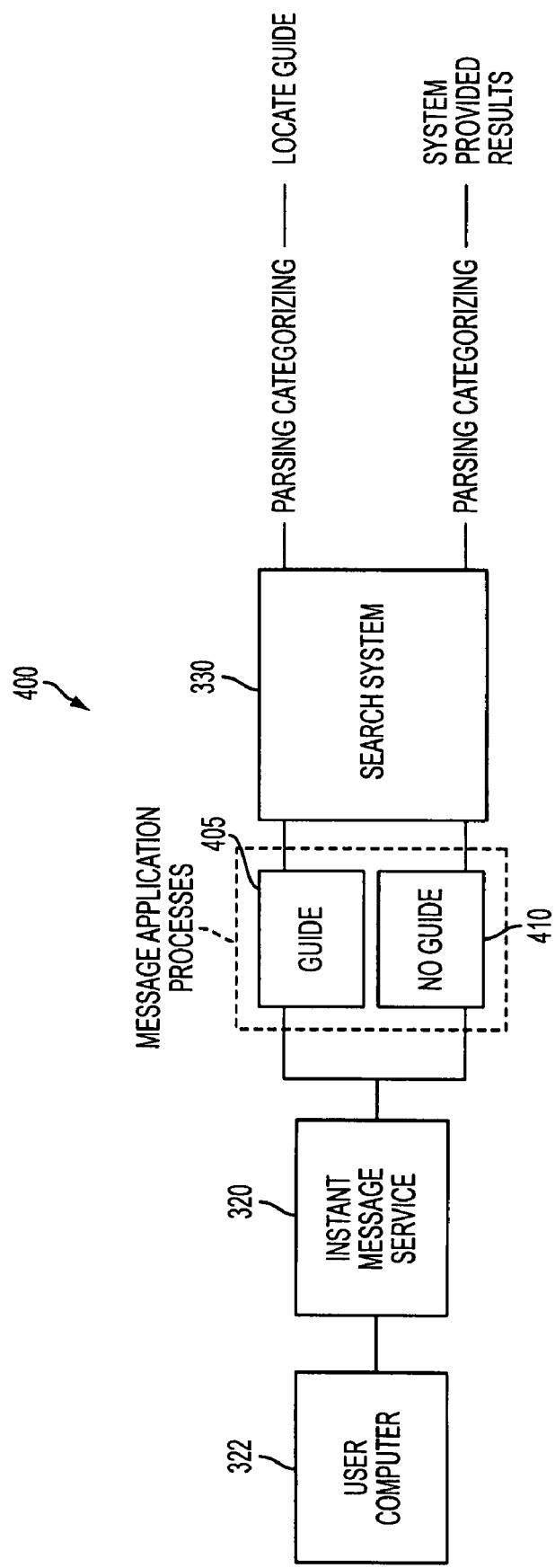
FIG. 4 is a system diagram illustrating an alternative embodiment of the search system.

As illustrated in FIG. 4, it should also be noted that more than one of each type of message application process can be provided. For example, in at least one embodiment, at least two message application processes can be included on the search system 330. For example, in a system in which a search can be performed with a guide or without a guide, as described in U.S. application Ser. No. 11/469,732 entitled, "A Search Tool Providing Optional Use of Human Search Guides," filed Aug. 4, 2006, by Scott A. Jones and incorporated herein by reference A message application process can be provided for each search option, that is, a message application process 405 for the search with a guide and another message application process 410 for the search without a guide.

In such an instance, the message application process 405 for the search with a guide allows a selected guide to communicate, for example, with the user 305 at the user computer 307. Similarly, the message application process 410 for the search without a guide allows the search system itself to pose as a buddy, email address, phone number or WAP with which the user at the user computer 307 can communicate to obtain system provided results, as described in U.S. patent application Ser. No. 11/469,732. It should be noted that the search system, the first message application server, and the second message application server are communicatively coupled to allow a human searcher or a search system to provide a response to an information search query submitted by an information seeker via the messaging services 310, 320 or 330.

Figure 5:
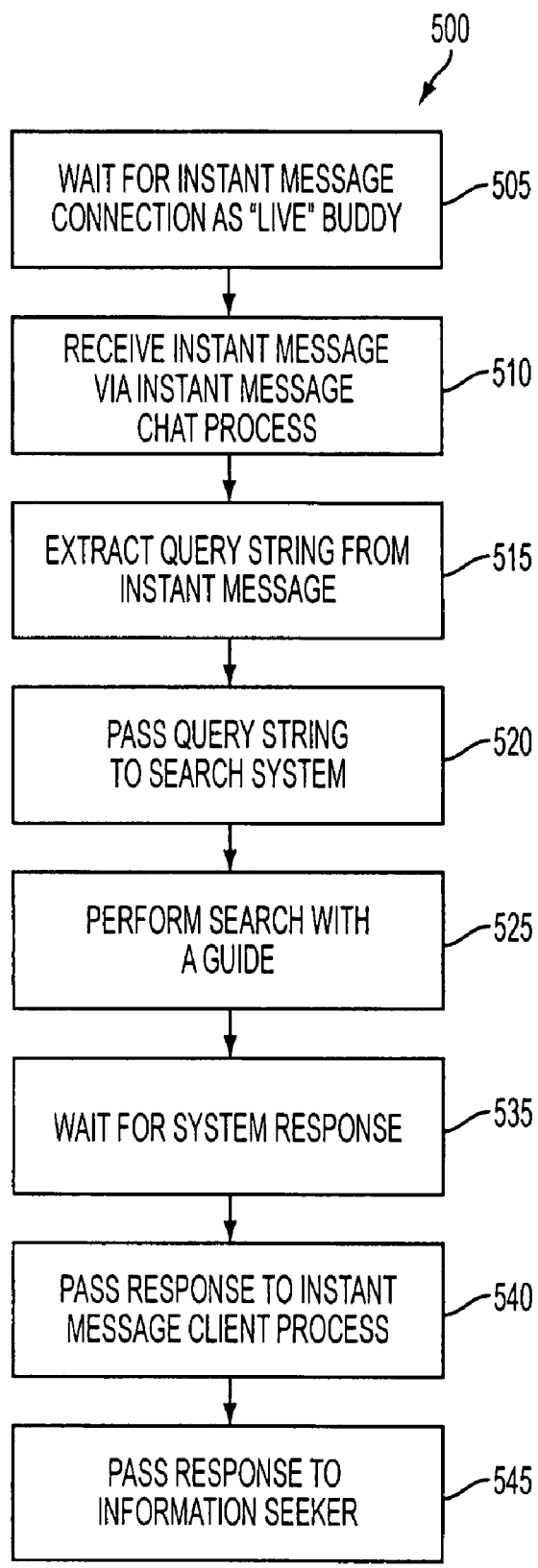
FIG. 5 is a flow chart of a process for chat-based search with a guide.

FIG. 5 illustrates an exemplary process 500 performed by the application process 405. In operation 505, a wait state is entered in which waiting occurs for an incoming message connection, that is, waiting for a connection in which a user desires to connect to a guide (search with a guide).

Process 500 then moves to receive 510 a message including the user's query string, for example, via the instant message application process 329 (FIG. 3). For example, if the user desired to obtain search results regarding the query string, "Who won the World Series in 2005?," the query string would be included in an instant message, for example, an AIM instant message available to the 'search expert' buddy via the message application process 405.

Process 500 then continues to extract 515 the query string from the message, by, for example, scanning the incoming text string for a colon (":") and parsing the text after the colon until a period or question mark is encountered. The extracted query is transmitted to an information search system, for example, the search system 380 in FIG. 3. Subsequent to that other parsing operations, keyword identification, guide selection, etc. may be performed as necessary to properly respond to the query.

During the extraction 515 and search time the system 380 can send advertisements to the user via the message application process 405 and then return to waiting for a search response.

Process 500 then continues to wait 535, the message application process 405 enters a wait state pending a search system response. For example, in at least one embodiment, the information search server 380 parses the query string to determine an appropriate guide to assign to respond to the query, based on keywords and/or categories to which the guide is assigned. Therefore, the wait state can last until the search engine has completed the search task, or responds in some manner.

Process 500 then proceeds to respond 540, after a search result, advertisement, or request for clarification is produced by the search system 380, the response is routed by the system 380 via the port from which the query arrived to the message application process 405 and then transmitted by the message application process to the user system 322 arbitrated by the message service 330.

Process 500 then proceeds to transmit 545, the response to the information seeker via the messaging service 330.

Figure 6:
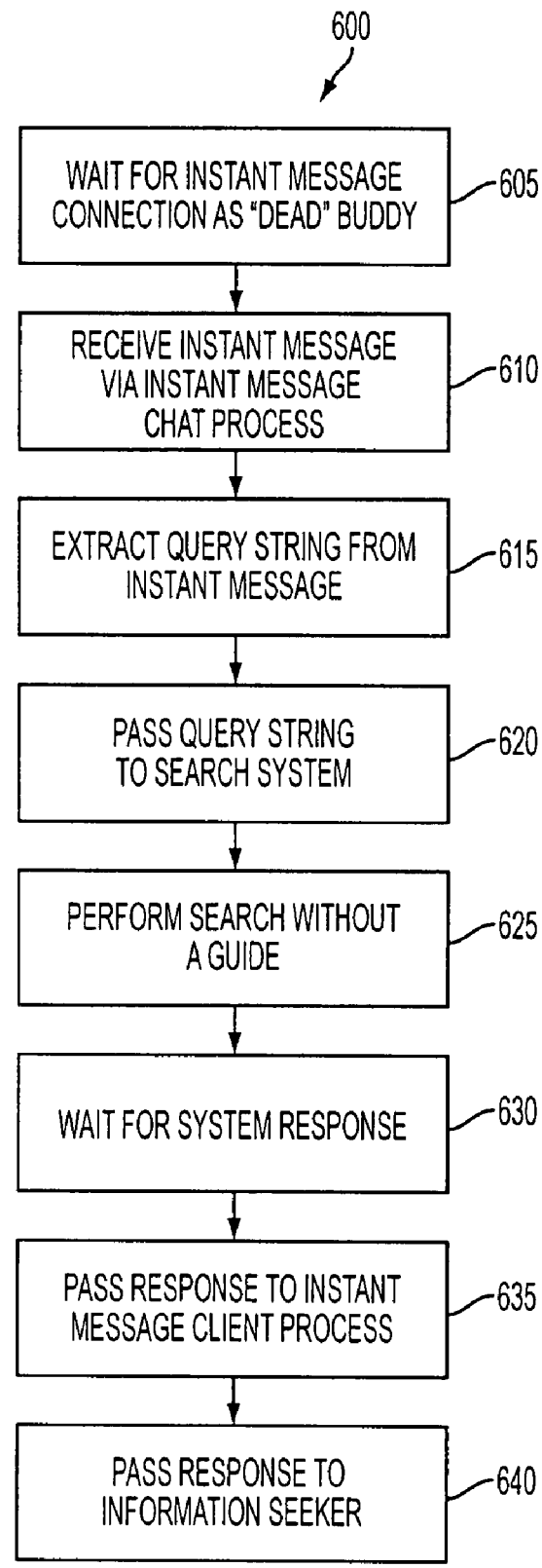
FIG. 6 is a flow chart of a process for chat-based search without a guide.

As illustrated in FIG. 6, the method 600 can be performed by the message application process 410, that is, the process corresponding to searching without a guide. The method 600 is similar to the method 500, with the essential difference being that the response is a system response without guide assistance, for example, a response provided by submitting the query to conventional search systems or a response to a previously answered query as described herein above.

It should be noted that although the embodiments described herein have been described in a one-on-one chat or instant messaging environment, the described embodiments can also be employed in other chat-room like scenarios. For example, the embodiments may be employed in an electronic chat room in which a first person is chatting with a second person, and the search system is invited into the chat room to provide search results to a search query. Similarly, the embodiments may be employed in an electronic chat room involving several other human users.

Similarly, more than one communication session might occur between a given user and the search system 330 using the messaging service/message application type interface. The search system might appear as a different 'buddy' alias, or phone/WAP access number or email address in the case where the information seeker selected, for example, to seek assistance from more than one guide or group of guides.

In an alternate embodiment, the IM chat interface could be used to invoke guided versus unguided searching using a keyword in the text (e.g. 'ChaGuide') or some other indicator in the message content which would be recognized in the extract operation 515 of process 500. In that way, a single message process 405 can perform the function of both processes 405 and 410.

It is thus possible for the info seeker to interact with the system using technologies, including instant messaging, mobile messaging technologies such as SMS, MMS, and EMS, or e-mail, as described above.

As part of the interaction between the messaging service (e.g. 320), the message application process (e.g. 329) and the user IM client 323 or the SMS service, it is possible to obtain information regarding the capability of the user device that is interacting with the search system via the messaging service. This type of information may include geographic data, such as area code or GPS information, and may also describe the capability of the user's device to receive and display advertising or other search results.

As previously described, during the wait state 535 of process 500 (see FIG. 5/6) a suitably selected advertisement can be sent to the user.

If it is determined during the interaction via the message application process (e.g. 329) that the user IM client 323 (ref FIG. 3) could be upgraded to allow a better user experience interaction with the search system 380, the search system may send a notification to the user via the IM service to make the user aware of this opportunity.

If the user elects to upgrade his IM client, the search system 380 or the instant message application 329 may send a suitable URL by IM, email, link on the user portal home page, or other suitable channels to the user. The new IM client may be an enhanced version of the client from the user's IM service provider, or a system-selected IM client which allows a richer interaction between the user and the search system. For example new types of media may be supported by the upgraded client, such as pictures, audio, video, or other media. The download and installation of the new client can be accomplished using well-known technologies.

If the user declines to upgrade, the system 380 may record this in the database 335. The system may further record the wish of the user to be reminded of this option in the future, or not to be reminded.

While a single IM service is described being connected to the search system in this embodiment it should be obvious to one of ordinary skill that multiple IM services could be connected to the search system using the methods and systems described herein.

The search system 330 can comprise a User Database 335 relative to the messaging interface users such as user 310 or user 317 (FIG. 3). The database 335 can include fields for User ID, User chat client info, and other user information which allow the system to assist the user as described above. The content of exemplary database 335 is illustrated in FIG.

7. The use of the database 335 is further described in the related provisional patent application 60/807,697 entitled, "Anonymous Search System Using Human Searchers,", filed Jul. 18, 2006 by Scott A. Jones et al, which is incorporated herein by reference. It should be noted that the unique identifier of the information seeker can be associated with chat credentials associated with an instant message transmission path of the system, thereby allowing any open queries to be answered when said information seeker re-connects to the system. It should also be noted that user instant message client information can be used to select suitable media for responding to an information seeker query. An information seeker can also interact with advertisement information during wait states of a chat session.

Figure 8:
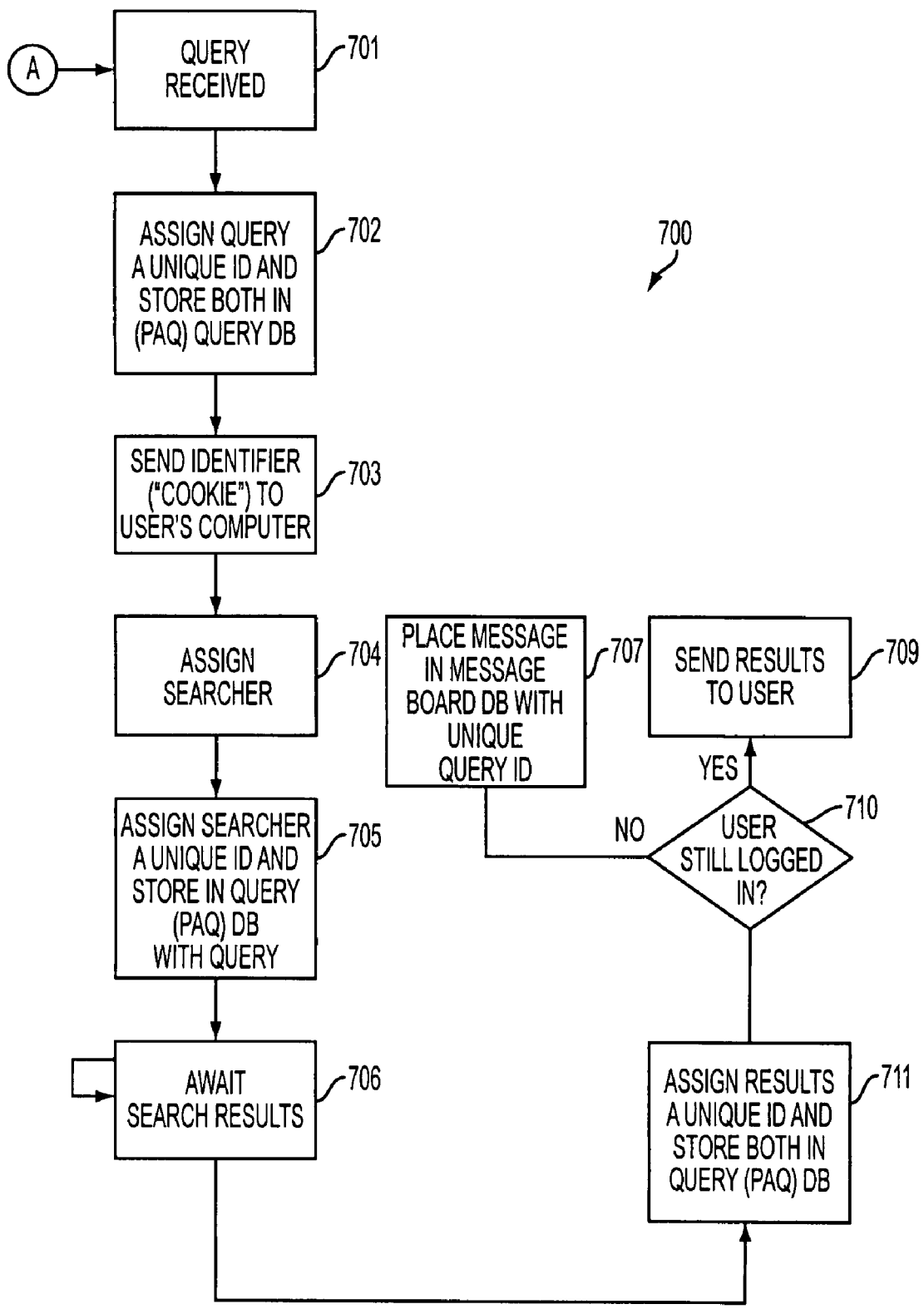
FIG. 8 is an exemplary flowchart for providing anonymous communication between a user and a searcher.

FIG. 8 illustrates process 700 for providing anonymous communication between a user and a searcher. As shown in FIG. 8, process 700 begins when a query is received 701. As mentioned above, a query may be a fully-formed question, keyword(s) or a search phrase, or any other type of query. After receiving 701 the query, process 700 moves to assigning 702 the query a unique identification (ID) and storing the unique ID and the query in the database 325 (FIG. 3). For example, a UID may be randomly generated based on a date of receipt of the query, IP or email address of the user submitting the query, Caller ID information, IM credentials, etc.

Subsequent to assigning 702 and storing the query and the unique ID, process 700 continues to recording 703 a unique ID for the user associated with the query (e.g., computer 102 in FIG. 1) in the database 325 (FIG. 3). This can be used for tracking when the user connects to the server 118 (FIG. 1).

After the unique ID has been recorded 703, a searcher is assigned 704 to handle the received query. When the server 118 receives a request from any of the user devices 102 for example, the server 118 may determine which of the registered searchers that are currently available are suitable to handle the query. For example, each available searcher registered to handle queries pertaining to the category "health" may be identified and ranked against other searchers registered for the category according to prior success in responding to queries to assign the query to top ranked available searcher(s) within the category. Various types of factors may be used to assign one or more searcher to a query received. Further, any criteria discussed in U.S. patent application Ser. No. 11/336,928, titled A SCALABLE SEARCH SYSTEM USING HUMAN SEARCHERS, inventor Scott A. Jones, filed Jan. 23, 2006 may be used. The server 118 may process search requests or queries by determining which searchers (providers or guides) are available to search for information being requested in a query received, based upon factors such as searchers that are logged in, searchers who are signed up for a keyword or category, the ranking of searchers based on previous performance, etc.

Subsequent to assigning 704 the searcher, process 700 continues to assigning 705 the searcher a unique ID and storing the query in association with the unique ID in the database 325 (FIG. 3) and search results are awaited 706. As mentioned above, the searcher may use various resources including search engines to conduct a search and generate search results in response to the received query. After the search result(s) has been generated, the results are assigned 711 a unique ID and stored in association with the query in the database 325 (FIG. 3).

After the unique ID is assigned 711 to the results generated by the searcher, process 700 continues to determining 710 whether the user is still logged in. When determining that the user is still logged in, results are sent 709 to the user. On the other hand, when determining that the user is no longer logged in, process 700 places 707 a message having the results in a message board database of results to be accessed by the user upon next login.

Figure 9:
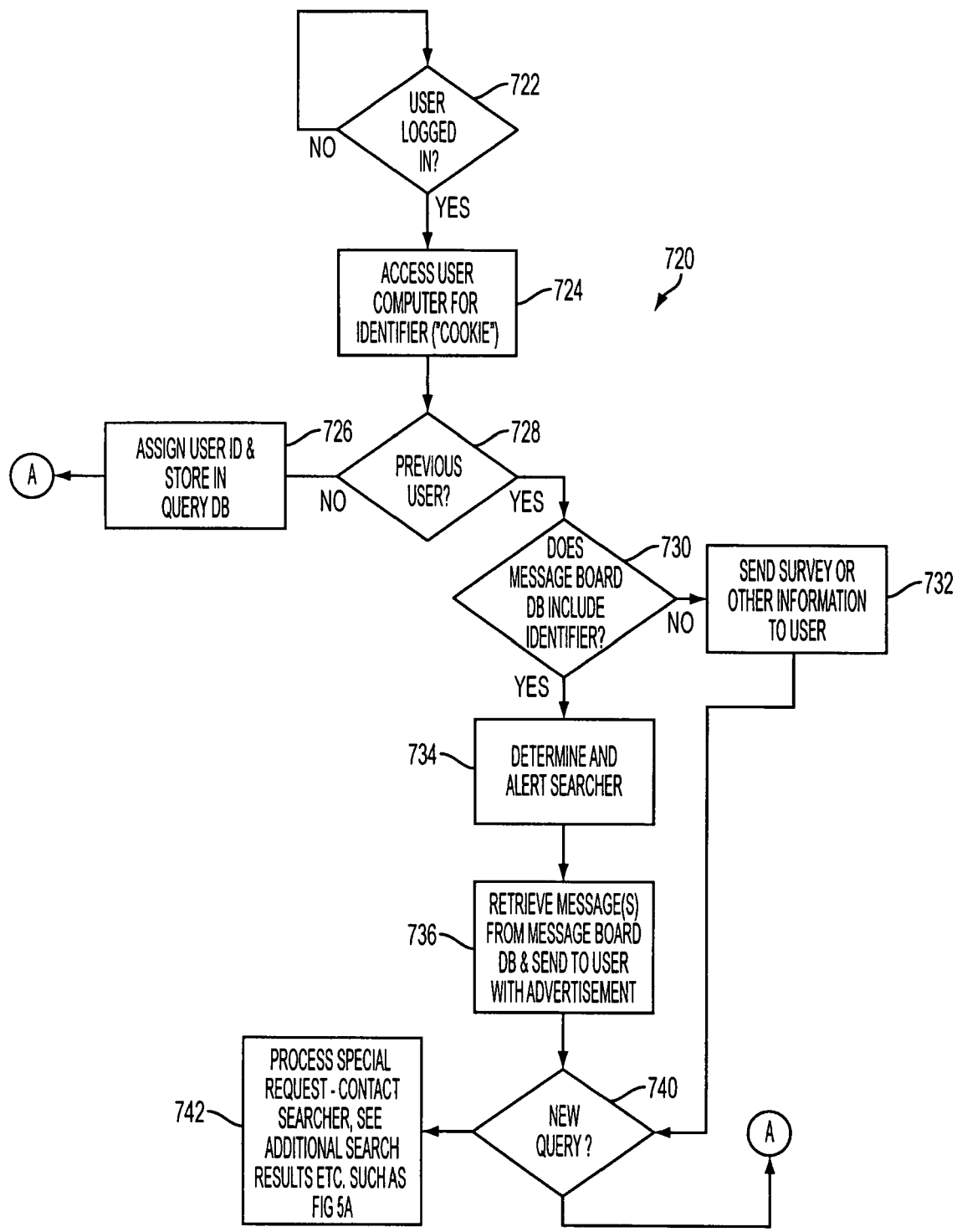
FIG. 9 is an exemplary flowchart for sending a message from a searcher to a user.

An exemplary process 720 for sending a message from a searcher to a user is illustrated in FIG. 9. As shown in FIG. 9, process 720 begins with determining 722 whether the user is logged in. For example, presence information assigned to the users on the IM service 340 (FIG. 3) may be used to determine whether a user is available.

Subsequent to determining 722 that a user query is received, process 720 continues by accessing 724 the database 325 (FIG. 3) to verify if the IM credentials are associated with a known user. Although the IM credentials of the user are illustrated as an identifier in relation to process 720, the method and system disclosed are not limited to use of IM credentials as an identifier. For example, an IP address assigned to the computer may be used as an identifier for identifying the computer of the user; a persistent 'cookie', caller ID, email address, or other ID information available with user consent can be used.

Figure 7:
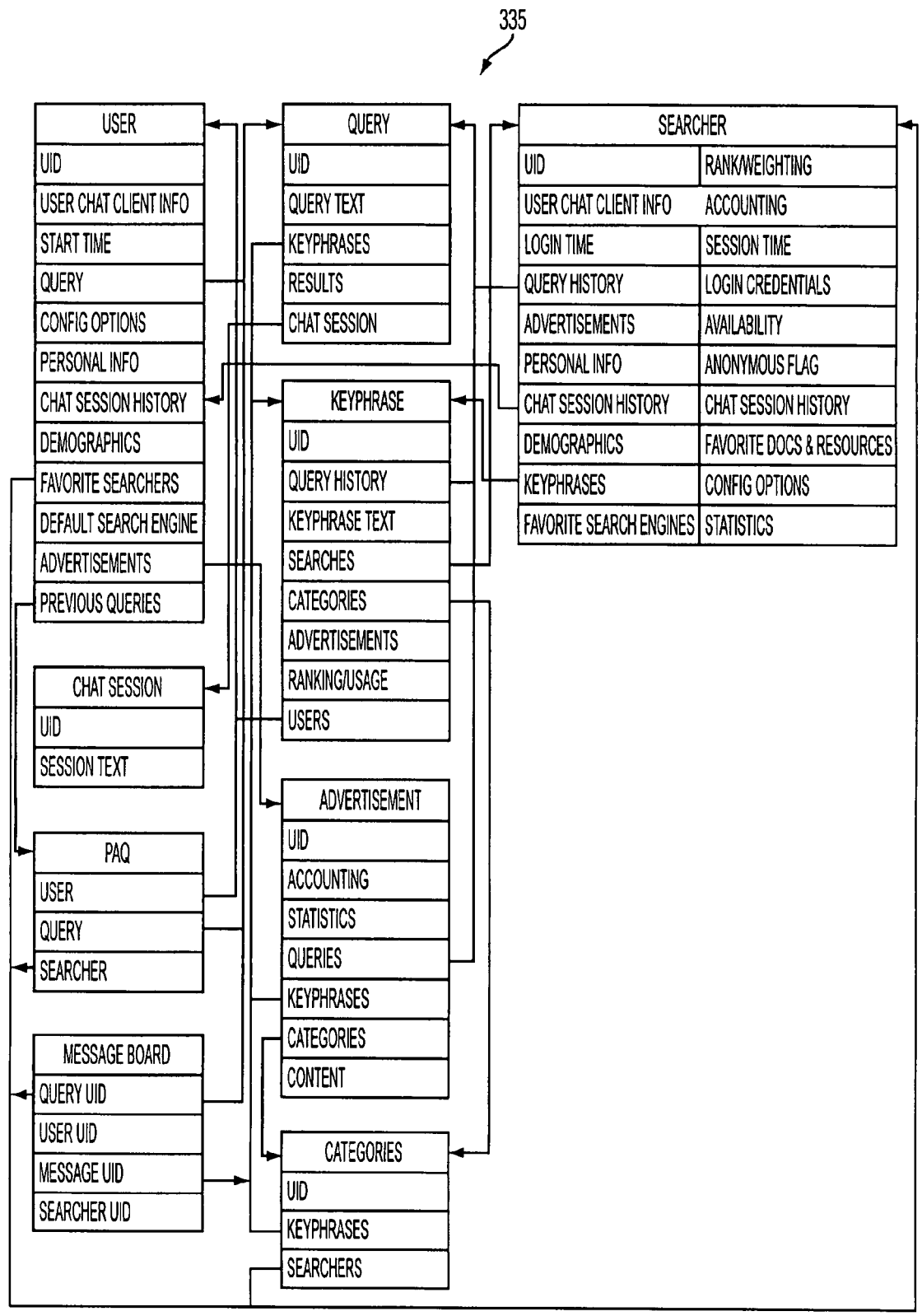
FIG. 7 is an illustration of the contents of a database illustrated in FIG. 3.

After accessing 724 the database 325 (FIG. 3), process 720 continues determining 728 whether the user is a previous user. Upon determining 728 that the user is not a previous user, process 720 continues by assigning 726 a user ID and storing the user ID in the query database 325 (FIG. 3). When determining 728 that the user is a previous user, process 720 continues to determine 730 whether a message board database 670 (FIG. 7) includes an identifier of the user.

When determining that the message board database does not include an identifier of the user, process 720 moves to sending 732 a survey or other information to the user and determining 740 whether there is a new query. For example, information requesting input of the user regarding the search system, advertisements, etc., may be sent to the user. On the other hand, when determining that the message board includes an identifier of the user, process 720 continues to determining 734 and alerting the searcher. For example, a searcher who has previously handled a query for the user is identified and sent an e-mail, an instant message, etc.

Subsequent to determining 734 and alerting the searcher, process 720 continues to retrieving message(s) 736 from the message board database and sending the message(s) to the user which may include an advertisement. For example, a message may be posted on the message board database regarding an update related to a result provided in response to a previous query of the user.

After retrieving 736 the message and sending the message to the user, process 720 continues to determining 740 whether there is a new query. When determining 740 that there is a new query, process 720 continues to process 700 (FIG. 8). On the other hand, when determining 740 that there is no new query, process 720 moves to processing special requests 742 including contacting the searcher, sending additional results, etc.

Because each user has a unique ID, which is associated with the unique ID of each query that was sent by him, and each searcher has a unique ID which is associated with the unique ID of the queries which were answered by him, and the results which were produced, it is thus possible to establish and re-establish anonymous communication between the searcher and the user. No identifying information (email, IM credentials, phone number, etc.) of the user or the searcher needs to be revealed in order for the communication to occur.

Figure 10:
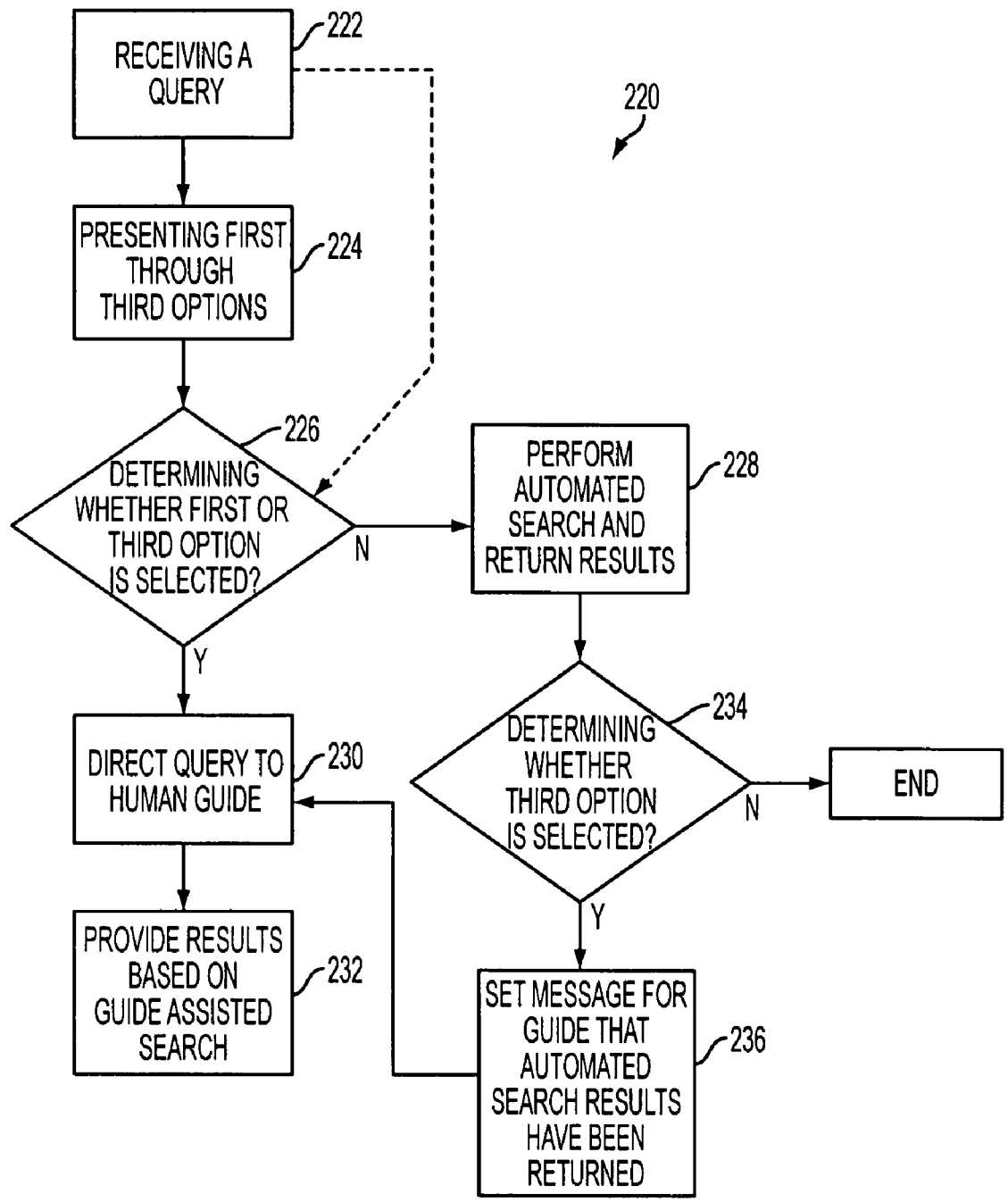
FIG. 10 is a flowchart for handling a query.

An exemplary process 820 utilizing human-aided search using messaging services is illustrated in FIG. 10. As shown in FIG. 10, process 820 begins by receiving 822 a request for initiating a search. As previously discussed, a request may be any type of inquiry or keyword(s) pertaining to which a user is seeking information such as a query regarding show time/location of a movie, a medical illness, etc.

Upon receipt 822 of the query, process 820 moves to presenting 824 first through third options for processing the query. The first through third options presented 824 provide a choice between submitting a request to human search guide (s), conducting a search without guide assistance or a combination of both. For example, a first option may be initiating a search without guide assistance, a second option may be initiating a guide assisted search and a third option may be a combination of initiating a search without guide assistance and a guide assisted search, simultaneously or in series.

Of course, if the separate message client option as illustrated in FIG. 4 is used and the user has submitted the query via a specific messaging client then presentation of the first through the third option has already occurred and the process 820 would proceed directly to determining 826 whether the first through the third options were selected as shown by the dashed line.

In situations when the interface of FIG. 4 is not used, process 820 moves to determining 826 whether first or third option is selected following the presentation 824 of options. Specifically, upon presenting 824 first through third options, process 820 determines 826 whether a search without guide assistance or a combination of a search without guide assistance and with a guide is selected. For example, a user under a time constraint may want to initiate a search without a guide such that automated search engines conduct the search and at the same time may initiate a guide assisted search submitting the search to a guide who may reply at a later time.

Upon determining 826 that the first or third option is selected, process 820 moves to performing automated search and returning results 828. Using the same example of the user having a limited time for a search, when the user selects the first option for initiating a search without a guide or the third option for initiating a combination of a search without a guide and with a guide, the user will be "instantly" presented with automated results. Subsequent to performing automated search 828 and returning results, process 820 determines whether the third option is selected 834. When it is determined that the third option is selected 834, process 820 sets 836 a message for a guide that automated search results have been returned and directs 830 the query to the guide. However, when it is determined that the third option was not selected, process 820 terminates and the system awaits further user input which may include submission of a new search request. However, when the user has selected the third option, the user is presented with automated results and further the query is directed to a guide, for example, while the user is reviewing the automated results.

On the other hand, upon determining 826 that the first or third option is not selected, process 820 moves to directing 830 the query to a human guide. For example, when the query received pertains to the category "world cup soccer 2006", process 820 determines which of the guides registered to the system 100 (FIG. 1) have registered to handle requests pertaining to the same or a similar category and directs the query to one or more of the guides. However, any criteria discussed in U.S. patent application Ser. No. 11/336,928 for matching guide(s) to a query submitted by a user may be used to direct the query to the guide(s) including but not limited to keyword(s) for which a guide has registered, prior successful searching by the guide (for this specific keyword and/or in general), speed of producing search results for users during past searches, and other factors that help to provide a quality search and experience for the user, proximity of the guide to location from which the request originated, etc.

Subsequent to directing 830 the query to the human guide, process 820 moves to providing results 832 based on guide assisted search. For example, the guide may utilize one or more existing search engines, obtain information from results returned from the search engine(s) and provide the obtained information as a response to the query.

The many features and advantages of the invention are apparent from the detailed specification and, thus, it is intended by the appended claims to cover all such features and advantages of the invention that fall within the true spirit and scope of the invention. Further, since numerous modifications and changes will be readily perceived by those of ordinary skill in the art, it is not desired to limit the invention to the exact construction and operation illustrated and described, and accordingly all suitable modifications and equivalents may be resorted to while falling within the scope of the invention.

What is claimed is:

1. A computer implemented method comprising:
providing identifiers of a search service to a user of an instant message service;
receiving an instant message from the user by a server device via an instant message identifier of the search service;
determining the identifier via which the instant message was received from the user;
extracting, by a processor, a search request from the instant message;
submitting the search request to an automated search resource selected based on content of the instant message when the identifier via which the message was received indicates an automated search is to be performed;
directing the search request to a human assistant selected based on the content of the instant message when the identifier via which the message was received indicates a human assisted search is to be performed;
performing the human assisted search or the automated search based on the identifier via which the message was received; and
sending a search result obtained responsive to the search request to the user using the instant message identifier via which the instant message was received.

2. The method of claim 1, wherein the server device includes a programmatic simulation associated with a plurality of instant messaging services and said receiving includes waiting for a user to add the instant message identifier of the search service to a buddy list of the user.

3. The method of claim 1, further comprising:
associating a unique identifier of the user with an instant messaging credential used to transmit the instant message, and
delivering a pending response to an instant messaging address associated with the credential when determining that the user is available to receive instant messages.

4. The method of claim 1, further comprising:
determining a keyword of the search request; and
selecting the automated search resource or the human assistant based on the keyword.

5. The method of claim 4, further comprising:
selecting a human searcher registered to perform searches associated with the keyword, and
providing the search request to the searcher from the server device.

6. The method according to claim 1, wherein the search result includes an advertisement selected based on the instant message service.

7. The method according to claim 1, comprising:
modifying an instant messaging client of the user responsive to activation of a URL provided by the search service.

8. The method of claim 1, comprising:
determining whether the instant message includes a trigger word external to the search request modifying the search process to be performed for the search request, and
executing a search based on the determining.

9. The method of claim 8, wherein the search result is produced by a human searcher registered to receive search requests associated with a keyword of the search query when the trigger word signifies the human assisted search.

10. The method of claim 1, wherein an automated search engine is selected based on historical use of the search engine by human searchers registered for a category of the instant message.

11. The method of claim 1, comprising:
determining media capabilities of an instant message client of the user; and
providing an advertisement selected based on the capabilities of the instant message client and a category of the search result.

12. The method of claim 1, wherein said performing comprises determining whether the user has requested assistance from an affiliate group of searchers with a common interest based on the identifier.

13. The method of claim 12, wherein an information search is performed by a search engine selected by a member of the affiliate group when determining that the user has requested assistance from the affiliate group and the identifier indicates the automated search is to be performed.

14. A system, comprising:
a search system comprising memory and a processor providing identifiers of a search service to a user of an instant message service, receiving an instant message from the user via an instant message identifier of the search service, determining the identifier via which the instant message was received from the user, extracting a search request from the instant message, submitting the search request to an automated search resource selected based on content of the instant message when the identifier via which the message was received indicates an automated search is to be performed, directing the search request to a human assistant selected based on the content of the instant message when the identifier via which the message was received indicates a human assisted search is to be performed, performing a human assisted search or the automated search based on the identifier via which the message was received, and sending a search result obtained responsive to the search request to the user using the instant message identifier via which the instant message was received;
a user system sending instant messages.

15. The system of claim 14, comprising:
a searcher system for obtaining the search result by a human searcher selected based on the identifier via which the message was received and the instant message; and
a resource system selected based on the identifier via which the message was received and the instant message.

16. The system of claim 14, wherein said search system comprises a mobile messaging server, an email server and a voice message server.

17. The system of claim 14 wherein the search system includes an email client.

18. The system of claim 14, wherein the search request is received as the instant message and the search result is provided to the user as an SMS message.

19. The system of claim 14, wherein the search request is received as the instant message and the search result is provided to the user as an email message.

20. The system of claim 14, wherein the search request is received as an SMS message and the search result is provided to the user as an MMS message.

21. The system of claim 14, wherein the destination of the search request is an automated search system selected based on a user identifier and an instant message address of a source of the search query.

22. The system of claim 14, wherein a destination of the search request is a human searcher selected based on an email address of a source of a search query and content of the instant message.

23. The system of claim 14, wherein a destination of the search result is a mobile phone associated with a user when a source of a search query is an instant message client which is not available when the search result is available.

24. The system of claim 14, wherein a destination of the search result is an instant messaging service associated with the user when a voice messaging service associated with the user is not available when the search result is available.

25. The system of claim 14, wherein a destination of the search result is an SMS messaging service associated with the user when a voice messaging service associated with the user is not available when the search result is available.

26. The system of claim 14, wherein a destination of the search result is an MMS messaging service associated with the user when an instant messaging service associated with the user is not available when the search result is available.

27. The system of claim 14, wherein a destination of the search result is a voice messaging service associated with the user when the instant messaging service associated with the user is not available when the search result is available.

28. The system of claim 14, wherein a destination of a search request is a human searcher who may establish instant messaging communication with the user without revealing the instant message address of the user to the human searcher.

29. A non-transitory computer-readable storage medium storing an instruction therein for causing a computer to perform an operation, comprising:
providing identifiers of a search service to a user of an instant message service;
receiving an instant message from the user via an instant message identifier of the search service;
determining the identifier via which the instant message was received from the user;
extracting a search request from the instant message;
submitting the search request to an automated search resource selected based on content of the instant message when the identifier via which the message was received indicates an automated search is to be performed;
directing the search request to a human assistant selected based on the content of the instant message when the identifier via which the message was received indicates a human assisted search is to be performed;
performing the human assisted search or the automated search based on the identifier via which the message was received; and
sending a search result obtained responsive to the search request to the user using the instant message identifier via which the instant message was received.

* * * * *